United States Patent
Rafrafi et al.

(10) Patent No.: US 12,435,344 B2
(45) Date of Patent: Oct. 7, 2025

(54) PROCESS AND DEVICE FOR THE PRODUCTION OF METHANE

(71) Applicants: Institut National des Sciences Appliquées de Toulouse, Toulouse (FR); Centre National de la Recherche Scientifique—CNRS, Paris (FR);
(Continued)

(72) Inventors: Yan Rafrafi, Pechabou (FR); Claire Dumas, Pechbusque (FR); Evrard Mengelle, Miremont (FR); Simon Dubos, Pechbusque (FR); Mansour Bounouba, Toulouse (FR); Delphine Delagnes, Ayguesvives (FR); Xavier Lefebvre, Gimont (FR); Mathieu Sperandio, Venerque (FR); Stéphane Palmade, Venerque (FR); Vincent Guerre, Toulouse (FR); Viviana Contreras, Toulouse (FR)

(73) Assignees: INSTITUT NATIONAL DES SCIENCES APPLIQUÉES DE TOULOUSE, Toulouse (FR); CENTRE NATIONAL DE LA RECHERCHE SCIENTIFIQUE—CNRS, Paris (FR);
(Continued)

( * ) Notice: Subject to any disclaimer, the term of this patent is extended or adjusted under 35 U.S.C. 154(b) by 1024 days.

(21) Appl. No.: 17/602,556

(22) PCT Filed: Apr. 7, 2020

(86) PCT No.: PCT/EP2020/059934
§ 371 (c)(1),
(2) Date: Oct. 8, 2021

(87) PCT Pub. No.: WO2020/208042
PCT Pub. Date: Oct. 15, 2020

(65) Prior Publication Data
US 2022/0195466 A1 Jun. 23, 2022

(30) Foreign Application Priority Data

Apr. 8, 2019 (FR) .................................. 1903721

(51) Int. Cl.
*C12P 5/02* (2006.01)
*C12M 1/00* (2006.01)
*C12M 1/107* (2006.01)

(52) U.S. Cl.
CPC ............... *C12P 5/02* (2013.01); *C12M 21/04* (2013.01); *C12M 23/58* (2013.01); *C12M 29/02* (2013.01); *C12M 29/06* (2013.01)

(58) Field of Classification Search
CPC .. C12P 5/02; C12P 5/23; C12M 21/04; C12M 21/16; C12M 23/58; C12M 23/02;
(Continued)

(56) References Cited

U.S. PATENT DOCUMENTS

| 4,396,402 A | 8/1983 | Ghosh | |
|---|---|---|---|
| 2003/0141243 A1* | 7/2003 | Groenestijn | C12M 21/04 210/603 |

(Continued)

FOREIGN PATENT DOCUMENTS

WO  2013060331 A1  5/2013

OTHER PUBLICATIONS

Corbellini et al.; "Hybid biogas upgrading in a two-stage thermophilic reactor"; Energy Conversion and Management, vol. 168, Jul. 1, 2018, pp. 1-10.
(Continued)

*Primary Examiner* — Michael L Hobbs
(74) *Attorney, Agent, or Firm* — WCF IP

(57) ABSTRACT

The present invention relates to a process for producing methane and to the device for producing methane, making it possible to increase the methane content of the outgoing gas
(Continued)

and preferably simultaneously to increase the methane content of the outgoing gas and the productivity of the reactor.

6 Claims, 3 Drawing Sheets

(58) Field of Classification Search
CPC ...... C12M 23/36; C12M 29/02; C12M 29/06; C12M 33/14; C12M 33/16
See application file for complete search history.

(71) Applicants: Institut National de Recherche pour l'Agriculture, l'Alimentation et l'Environnement (INRAE), Paris (FR); Enosis, Toulouse (FR)

(73) Assignees: INSTITUT NATIONAL DE RECHERCHE POUR L'AGRICULTURE, L'ALIMENTATION ET L'ENVIRONNEMENT (INRAE), Paris (FR); ENOSIS, Toulouse (FR)

(56) References Cited

U.S. PATENT DOCUMENTS

| | | | | |
|---|---|---|---|---|
| 2010/0317074 | A1* | 12/2010 | Simpson | C12P 7/08 |
| | | | | 435/140 |
| 2011/0136213 | A1* | 6/2011 | Stewart | C12P 5/023 |
| | | | | 435/303.2 |
| 2019/0106341 | A1* | 4/2019 | Buck | C02F 3/005 |

OTHER PUBLICATIONS

Voelklein et al.; "Biological methanation: Strategies for in-situ and ex-situ upgrading in anaerobic digestion"; Applied Energy, vol. 235, Feb. 1, 2019, pp. 1061-1071.

Alitalo et al.; "Biocatalytic methanation of hydrogen and carbon dioxide in a fixed bed bioreactor"; Bioresource Technology, vol. 196, Aug. 14, 2015, pp. 600-605.

Kougias et al.; "Ex-situ biogas upgrading and enhancement in different reactor systems"; Bioresource Technology, vol. 225, Dec. 2, 2016, pp. 429-437

Aryal et al.; "An overview of microbial biogas enrichment"; Bioresource Technology, vol. 264, Jun. 14, 2018, pp. 359-369.

* cited by examiner

[Fig. 1]
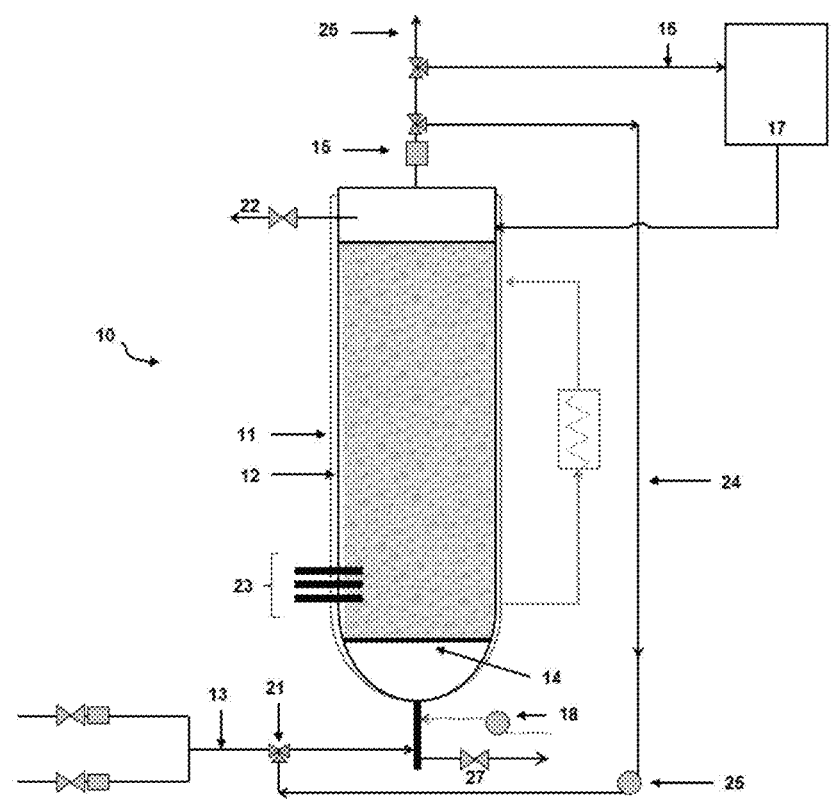

[Fig. 2]
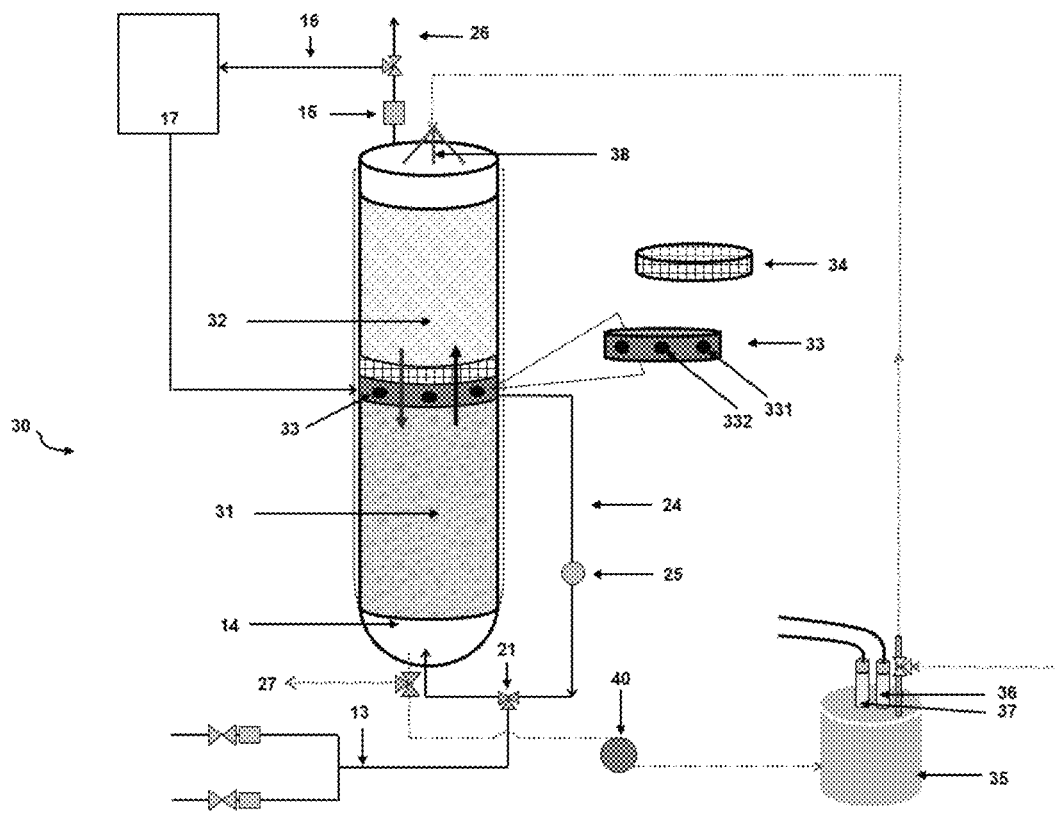
[Fig. 3]
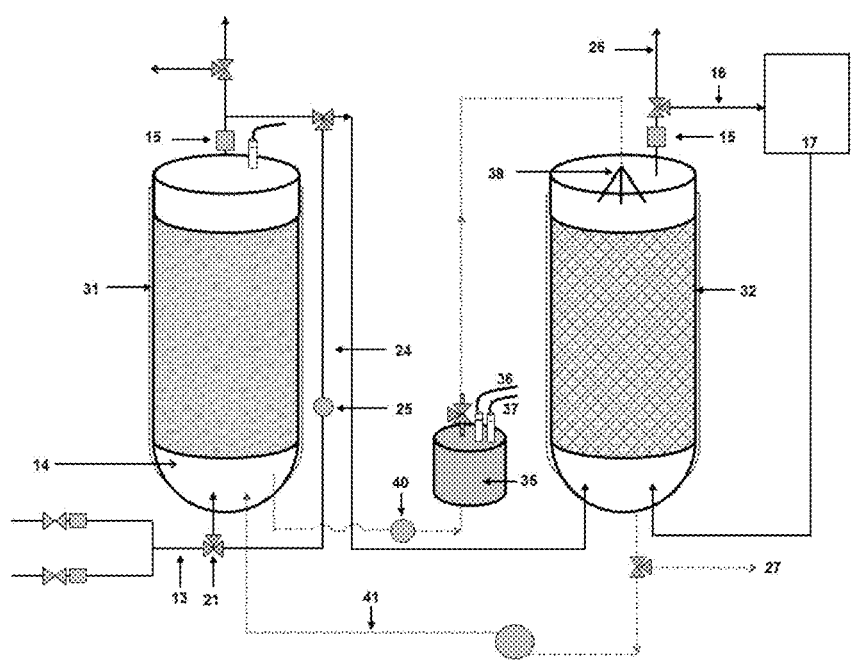

[Fig. 4]
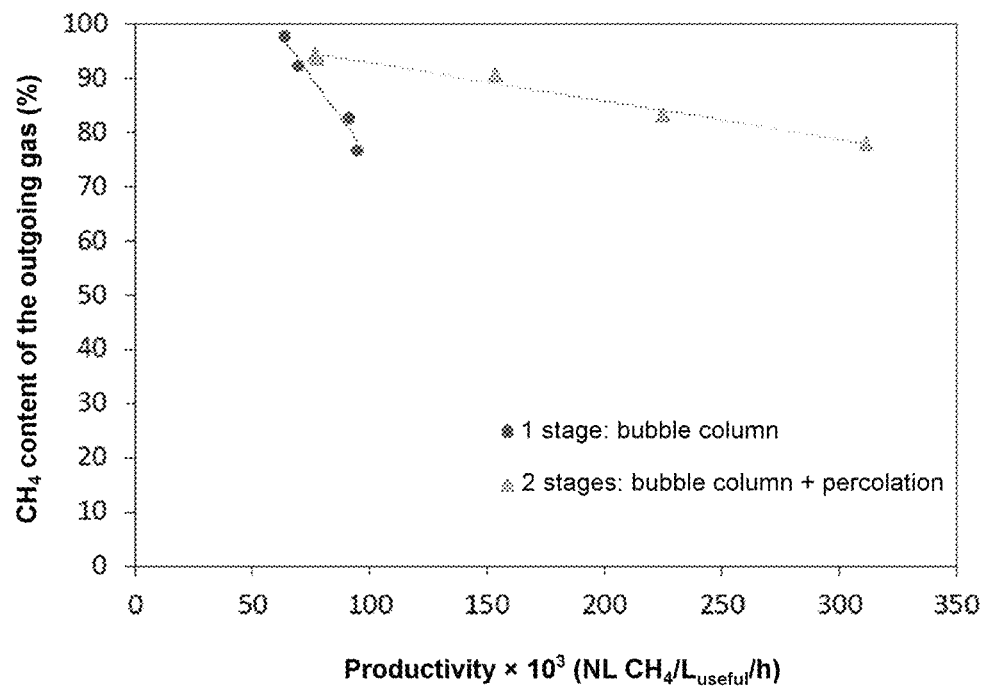
[Fig. 5]
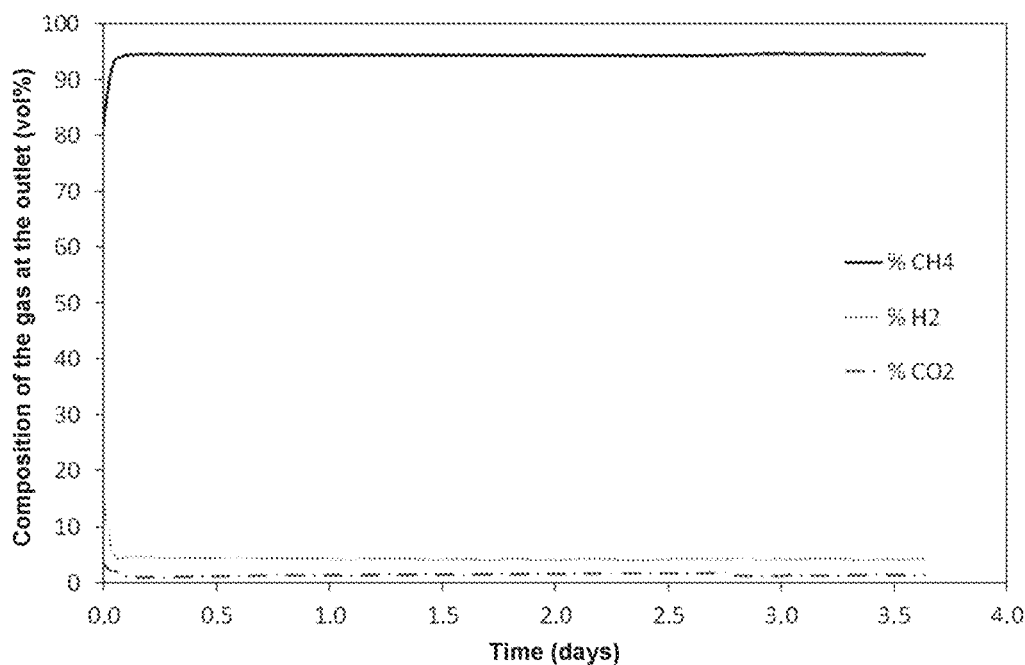

PROCESS AND DEVICE FOR THE PRODUCTION OF METHANE

TECHNICAL FIELD

The invention relates to processes and also devices for producing methane.

PRIOR ART

Biological methanation technology consists of one or more reactors, containing microorganisms in an aqueous liquid medium. These microorganisms are supplied, on the one hand, with streams of carbon dioxide ($CO_2$) in the gas state and, on the other hand, with streams of hydrogen ($H_2$) also in the gas state. It is the metabolism of the microorganisms which allows the conversion of the $CO_2$ and $H_2$ molecules into methane ($CH_4$) and water ($H_2O$) molecules via a methanation reaction.

Methanation makes it possible to convert into methane industrial gases containing $CO_2$, such as the biogas produced by methanization, the syngas produced by pyrolysis or gasification, or combustion effluents. These gases can thus be injected into natural gas networks or be used directly for applications such as mobility.

The methanation reaction is exothermic.

Numerous parameters influence biological methanation technology.

Typically, specific strains and variants are developed for improving methanation processes, such as for example those described in international patent application WO 2012/094538 from the University of Chicago, and more particularly the isolated *Methanothermobacter thermautotrophicus* strain UC120910, deposited on Dec. 21, 2010 with the American Type Culture Collection (ATCC®) under patent deposit identification number ATCC® PTA-11561.

Mention will also be made, as a parameter which influences biological methanation technology, of the composition of the medium comprising the microorganisms. Typically, patent EP 2 959 003 describes the influence of the nitrogen concentration on the methane productivity rate and of the biomass contained in the bioreactor.

It is also known that the temperature, the pH and also the pressure have a direct influence on methane production. For example, document EP 2 675 904 describes specific hydrogen partial pressure/$CO_2$ partial pressure ratios which make it possible to optimize methane production. Application WO 2013/060331 also describes the fact that maintaining the pH in the bioreactor between 7 and 8 would make it possible to increase the amount of methane obtained.

The gas feed flow rate is also an important parameter. Typically, patent application EP 2 872 637 describes flow rates for injection of hydrogen and carbon dioxide into a reactor greater than 2.1 volumes of gas per volume of medium and per minute (vvm). According to the present application, high flow rates allow an increase in productivity. However, the methane content in the mixture obtained is low.

The various prior art documents mainly make it possible to increase productivity, that is to say the amount of methane produced for a given reactor volume, but do not make it possible to obtain gases with a very high methane content, in particular a methane content of 90% or more. The increase in productivity occurs to the detriment of the methane content. Conversely, some processes which make it possible to obtain a high methane content have a low productivity.

However, the methane content obtained is a key factor. In order for a gas to be injected into the natural gas network, it must in fact satisfy specifications defined by the natural gas network administrators. These specifications vary from one country to the other and include numerous criteria. These various criteria generally involve a methane content greater than 95%, or even higher. Likewise, standard ISO 15403, which defines the specifications of natural gas that can be used as compressed natural gas for vehicles, involve a high methane content.

The obtaining of a high methane content at the output of the biological methanation process therefore makes it possible to limit, or even eliminate, the post-treatment of the gas required to achieve the specifications which allow it to be exploited.

Numerous prior art documents also describe hybrid processes which implement a two-step process: an in situ methanation reactor and an ex situ methanation reactor. The methanization and methanation reactions take place in the first reactor. These methanization and methanation steps are carried out in one and the same bioreactor (in situ biogas upgrade). This bioreactor is an anaerobic digester which receives organic matter, into which hydrogen will also be injected. The methane produced and the liquid effluent will be injected into a second reactor (ex situ upgrade) in which the methanation takes place (Hybrid biogas upgrading in a two-stage thermophilic reactor, Corbellini et al., Energy conversion and management 168 (2008) 1-10).

These processes thus implement a first step of injecting hydrogen during the methanization of organic substrates in order to increase methane production, and a second step of ex situ methanation. However, the methanization involves long organic substrate degradation times. It is therefore necessary to simplify the processes for producing methane, but also to intensify them.

Furthermore, methanization is a complex process which involves many syntrophic interactions within consortia composed of bacteria and Archaeans which are anaerobic. However, the injection of a surplus of hydrogen can affect the methanization performance results by i) partly blocking this trophic chain because of the increase in hydrogen partial pressure ($pH_2$) (Agneessens et al. 2018) and ii) increasing the pH of the reactor because of the $CO_2$ consumption and thus blocking the methanogenic activity (Luo and Angelidaki 2012). Adjustment of the pH and fine control of the amount of hydrogen injected are often necessary in order to overcome these problems. However, these facilities are difficult to operate and can considerably increase the installation and process exploitation costs (Angelidaki et al. 2018).

Technical Problem

While some prior art processes make it possible to achieve good productivity, the methane content obtained is low. Although other processes make it possible to obtain good methane enrichment in the gas mixture obtained, the productivity is lower. Thus, the solutions described in the prior art do not make it possible to obtain both a high productivity and a high methane content.

Thus, the process and the device according to the present invention propose to increase the methane content of the gas for at least a reactor productivity identical to that of the prior art, and advantageously to simultaneously increase the methane content of the outgoing gas and the reactor productivity. In addition, the process according to the invention is advantageously simpler to implement compared to the in situ methanation processes which have to be combined with a first step of methanization.

SUMMARY OF THE INVENTION

Thus, what is proposed is a process for producing methane, comprising:
- a step (a), in a first bioreactor comprising methanogenic microorganisms in a liquid medium, of production of a gas mixture comprising methane, consisting in bringing said microorganisms into contact with incoming gases;
- a step (b), in a second bioreactor, of methane enrichment of the gas mixture obtained in step (a), consisting in at least partly transferring, from the first bioreactor to the second bioreactor, on the one hand the gas mixture obtained in step (a) and, on the other hand, the liquid medium contained in the first bioreactor, so as to increase the methane content in the gas mixture.

Very advantageously, step a) of the process according to the invention makes it possible to increase the productivity, that is to say to increase the amount of methane produced in the first bioreactor.

Advantageously, step b) of the process according to the invention allows the enrichment of the methane content in the gas mixture in order to obtain a methane content greater than 90%.

Thus, steps a) and b) of the process according to the invention make it possible to simultaneously increase the methane content of the outgoing gas and the reactor productivity.

It is known that methanation can be carried out in situ in a biogas digester or ex situ in an external reactor.

In an in situ methanation system, an organic substrate and additional hydrogen are added to the digester to produce biogas. As in the case of conventional anaerobic digestion, the organic substrate degradation steps provide intermediates such as volatile fatty acids and precursors such as carbon dioxide for the methanation process.

Conversely, in an ex situ system as is the case for the present invention, the carbon dioxide (originating for example from a fermentation process), hydrogen, essential nutrients and methanogenic microorganisms are necessary and must be introduced. The initial steps of the anaerobic digestion (hydrolysis and acidogenesis) are not present in an ex situ system (Voelkein et al., Biological methanation: strategies for in-situ and ex-situ upgrading in anaerobic digestion, Applied Energy 235 (2019)).

The term "methanization" is intended to mean the process implemented in methanizers and which makes it possible to convert the organic matter of wastewater or of waste into a biogas composed of methane ($CH_4$) and of carbon dioxide ($CO_2$). Methanization involves four biological reactions (hydrolysis, acidogenesis, acetogenesis, methanogenesis) ensured by several microbial species which interact with one another while constituting a trophic network.

The term "in situ methanation" is intended to mean the process which consists in injecting hydrogen directly into the methanizer. In situ methanation requires carefully controlling the amount of $H_2$ introduced into the digester, since a high concentration/partial pressure of $H_2$ can pose problems: such as inhibition of the microorganisms responsible for the acetogenesis in methanizers.

The term "ex situ methanation" is intended to mean the process which consists in injecting hydrogen and carbon dioxide or biogas or syngas (mixture of gases containing mainly CO, $CO_2$ and $H_2$ and produced by pyrolysis or gasification) into an independent reactor.

Thus, the term "process for producing methane" according to the present invention is intended to mean an ex situ methanation process. The process consists in fact of the injection of hydrogen and carbon dioxide into an independent reactor.

Steps a) and b) of the process according to the invention are methanation steps. The process according to the invention is thus an ex situ methanation process which is simpler to implement compared to the prior art process. The ex situ methanation is very advantageous because i) it makes it possible to not disrupt the methanization (the methanation reaction taking place in an exterior unit), ii) it offers the possibility of dissociating the operating conditions between the methanizer and the methanation reactor, such as the use of different temperature and pressure. It is thus possible to impose optimal conditions for adapting to hydrogenophilic methanogens (high temperature and high pressure), the hydrogen partial pressure no longer being a problem, iii) the biochemical process is simpler because the initial steps of the methanization, such as the hydrolysis and acidogenesis, are not carried out in the reactor, iv) the process is more flexible since it allows the use of other sources of gases (industrial $CO_2$, syngas, etc.), and v) the gas leaving the methanation reactor is sufficiently rich in methane to allow it to be directly injected into the natural gas network.

Advantageously again, the two-step process according to the invention makes it possible to optimize and increase, simultaneously, the productivity of the process and the methane content of the outgoing gas, i.e. to obtain an appropriate productivity/methane content pairing compared to the conventional ex situ methanation process (for example carried out in a single bioreactor).

Preferentially, the incoming gases are hydrogen ($H_2$) and carbon dioxide ($CO_2$).

The $CO_2$ used in the process according to the invention may be a pure gas or may originate from a gas mixture comprising $CO_2$. In general, the $CO_2$ can originate from any source. Typically, the pure gas may be a synthesis gas obtained by any manufacturer known to those skilled in the art. The process for producing methane according to the present invention can also be supplied with $CO_2$ by introducing biogas resulting from the digestion of organic waste in the context of methanization.

The methanization may be, by way of illustration, a dry or liquid methanization, a process for methanization of sludge, agricultural waste, green waste, agrofoods waste and household waste.

The process for producing methane according to the present invention can be supplied with biogas directly leaving the methanization digester, without recourse to particular purification or after treatment of impurities ($H_2S$, volatile organic compounds (VOCs), siloxanes, etc.).

In the process according to the invention, only the biogas resulting from the methanization is used. The fermentable materials or organic substrates used in the methanization process are not injected in the first step of the process according to the invention.

According to one embodiment, the $CO_2$ originates from the discharge of biogas produced by the burial of organic waste.

The $CO_2$ can also originate from gases produced by processes for thermochemical treatment of dry biomass or of solid waste (pyrolysis and gasification processes producing syngas).

The CO₂ can also be by-product CO₂. Where appropriate, the by-product CO₂ is purified in order to remove the pollutants and/or to obtain a high CO₂ concentration.

In one embodiment, the CO₂ input can consist of a mixture of the various sources as described above.

The hydrogen used in the process according to the invention may be a pure gas or may originate from a mixture of gases comprising hydrogen. In general, the hydrogen can originate from any source. Typically, the pure gas can be a synthesis gas obtained by any manufacturer known to those skilled in the art.

According to one embodiment, the hydrogen can be produced by electrolysis of water using electricity withdrawn from the electrical network or originating from a renewable electricity production source.

The electrolysis may be alkaline electrolysis, PEM (membrane) electrolysis or high-temperature electrolysis (SOEC).

According to one embodiment, the hydrogen may be by-product hydrogen (or hydrogen by-product from industrial sources).

Where appropriate, the by-product hydrogen is purified in order to remove the pollutants and/or to increase the H₂ concentration.

According to one embodiment, the hydrogen can also originate from gases produced by processes for thermochemical treatment of dry biomass or of solid waste (syngas).

According to one embodiment, the hydrogen is obtained from organisms by photosynthesis or by fermentation in medium in the dark (process known as "dark fermentation") in a separate reactor.

In one embodiment, the H₂ input can consist of a mixture of the various sources as described above.

Thus, the carbon dioxide and the hydrogen are injected in gas form into the first bioreactor and are consumed by the microorganisms in the liquid phase or reaction medium in order to generate a gas mixture in the first bioreactor.

The term "methanogenic microorganisms" is intended to mean any microorganisms capable of producing methane, preferentially from hydrogen and from carbon dioxide.

The organisms are mainly hydrogenotrophic organisms, homoacetogens and acetoclastic methanogens.

Hydrogenotrophic methanogens directly metabolize methane from hydrogen and from carbon dioxide. The methanation reaction can be represented in the following way:

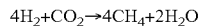

$$4H_2 + CO_2 \rightarrow 4CH_4 + 2H_2O \quad \text{[Math. 1]}$$

Homoacetogens and acetoclastic methanogens use acetate as an intermediate substrate in the production of methane. The methanation reaction is carried out according to several successive and indissociable steps, for example:

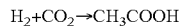

$$H_2 + CO_2 \rightarrow CH_3COOH$$

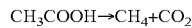

$$CH_3COOH \rightarrow CH_4 + CO_2 \quad \text{[Math. 2]}$$

Thus, and according to one embodiment, the microorganisms are chosen from hydrogenotrophic methanogenic microorganisms, homoacetogenic microorganisms, acetoclastic methanogenic microorganisms or a mixture of these microorganisms.

The hydrogenotrophic and acetoclastic methanogenic microorganisms are Archaeans (or the Archaea), strictly anaerobic, procaryotic unicellular microorganisms which belong to the kingdom Euryarchaeota. They may in particular be chosen from four classes of Archaeans: Methanobacteria, Methanomicrobia, Methanococci and Methanopyri.

The homoacetogenic microorganisms are bacteria (anaerobic, procaryotic unicellular microorganisms) which belong mainly to the class Clostridia and produce acetate from CO₂ and from H₂.

These bacteria belong in particular to the genera *Clostridium, Acetobacterium, Sporomusa, Acetogenium, Acetoanaerobicum, Pelobacter Butyribacterium, Eubacterium*.

In one preferred embodiment, the methanogenic microorganisms are chosen from the classes Methanobacteria and Clostridia.

The terms "biomass" or "cell culture" are intended to mean the collection of microorganisms as defined above, which may or may not be methanogenic, from one or more species used in the process according to the invention for producing methane from carbon dioxide and from hydrogen. These microorganisms are placed in the first reactor by inoculation of the liquid medium contained in the first reactor or by inoculation of a liquid medium that will subsequently be introduced into the first reactor according to the present invention.

Thus, and advantageously, the microorganisms are brought into contact with the CO₂ and H₂ in a liquid medium in which the microorganisms are maintained.

The terms "liquid medium" or "reaction medium" are intended to mean the liquid medium in which the microorganisms are maintained, in order to generate a gas mixture, and into which the CO₂ and the H₂ will be injected and dissolved, whether or not this medium allows the production of biomass. In the context of the invention, the reaction medium comprises at least water, nutrients, and dissolved CO₂ and H₂.

Preferentially, the liquid medium or reaction medium is composed of sources of nutrients (nitrogen, calcium, potassium, sulfur, phosphorus, magnesium) and trace elements (iron, zinc, copper, cobalt, nickel, molybdenum, iodine and boron) required for the microbial growth and activity.

The liquid medium according to the invention may also comprise acetate.

Preferentially, the liquid medium in the first bioreactor is a continuous liquid phase.

For the purposes of the present invention, the term "continuous liquid phase" is intended to mean a liquid volume having a physical continuity, as opposed to a discontinuous liquid volume consisting of a collection of liquid phases without contact with one another, such as liquid drops percolating in a gas phase.

For the purposes of the present invention, the term "gas mixture" is intended to mean the gas mixture generated in the first reactor. Preferentially, the gas mixture comprises at least hydrogen (H₂), carbon dioxide (CO₂) and methane (CH₄).

Thus, advantageously, step (a) according to the process of the invention makes it possible to generate a gas mixture comprising at least H₂, CO₂ and CH₄, and to obtain optimal conditions for the growth of the methanogenic microorganisms. Advantageously, step (a) ensures a high productivity, by virtue of a high incoming gas flow rate. Particularly advantageously, the first bioreactor makes it possible to convert more than 80% of the hydrogen contained in the incoming gases.

Again advantageously, step (b) according to the process of the invention makes it possible to decrease the hydrogen content and the carbon dioxide content in the gas mixture obtained in step (a) and to increase the methane content in the gas mixture obtained in step (a). This enrichment step is permitted by the introduction into the second bioreactor (step (b)) of the liquid medium taken from the first bioreactor (step (a)) and also the transfer of the gas mixture.

These two steps of the process according to the invention thus make it possible to optimize and to simultaneously increase the productivity of the process and the methane content of the outgoing gas, i.e. to obtain an appropriate productivity/methane content pairing.

For the purposes of the present invention, the term "productivity" is intended to mean the flow rate of methane produced per useful volume of the reactor. The productivity is thus expressed in $Nm^3/h$ of methane produced per useful $m^3$ of the reactor, said unit commonly being expressed as v/v/h (methane production rate: v/v/h) by those skilled in the art. The productivity may also be expressed in Nl/h of methane produced per liter of reactor.

The productivity is measured by any technique known to those skilled in the art. Typically, the productivity can be measured by measuring the total outgoing gas flow rate using a Pitot probe and by measuring the methane content using an infrared spectrometry gas analyzer. The methane flow rate calculate from these data is related back to the useful volume of the reactor mobilized by the reaction.

According to one embodiment, the productivity is at least 0.1 v/v/h, preferentially at least 1 v/v/h, preferential at least 5 v/v/h, preferentially at least 10 v/v/h, preferentially at least 20 v/v/h and preferentially at least 30 v/v/h.

For the purposes of the present invention, the term "methane content" is intended to mean the molar fraction of methane in the gas leaving the reactor.

According to one embodiment, the term "high methane content" is intended to mean an outgoing gas containing at least 80% of methane, preferentially 85%, more preferably 90%, preferentially 91%, preferentially 92%, preferentially 93%, preferentially 94% and particularly preferably at least 95%, preferentially at least 96%, preferentially at least 97%, preferentially at least 98%, and preferentially at least 99%.

Thus, and advantageously, the process according to the invention makes it possible to obtain biomethane, which is directly injectable into the natural gas network, without an additional purification step.

The methane content of an outgoing gas is measured by any technique known to those skilled in the art. Typically, the methane content is measured using an infrared spectrometry gas analyzer or gas chromatography. The methane content is expressed on a dry gas basis.

Advantageously, the process according to the invention makes it possible to obtain a productivity of at least 0.15 v/v/h at atmospheric pressure and a methane content in the outgoing gas of at least 90%.

The characteristics set out in the following paragraphs can optionally be implemented. They can be implemented independently of one another or in combination with one another.

According to the process of the invention, the transfer of the liquid medium is carried out by sampling said liquid medium in the first bioreactor and then by injecting said liquid medium into the upper part of the second bioreactor so that said liquid medium circulates by gravity in the second bioreactor and is recovered in the first bioreactor.

Preferentially, the liquid medium circulates, in the second bioreactor, through packing. The packing may be random packing or structured packing. By way of illustration, the packing may be carried out with Pall® rings.

Advantageously, the packing makes it possible to increase the contact surface between the liquid medium and the gas mixture.

Also advantageously, the packing allows the development of a microbial biofilm. Thus, the methanation reaction catalysts can be in free form in step a) and in the form of fixed biomass in step b) of the process according to the invention.

Still advantageously, the injection of the liquid medium into the second bioreactor and the circulation of the liquid medium by gravity in this second bioreactor, preferentially through packing, will allow the liquid medium to circulate by a percolation phenomenon that will make it possible to increase the contact surface between the liquid and the gas mixture obtained in step (a) and to facilitate the colonization and the renewal of the microbial biomass on the packing. The hydrogen content and the carbon dioxide content of the gas mixture obtained in step (a) will thus decrease and the gas mixture will be enriched with methane.

According to one embodiment, in the process according to the invention, the liquid medium is a continuous liquid phase into which the incoming gases are injected, and the second bioreactor contains a continuous gas phase.

Advantageously, the injection of the incoming gases into the continuous liquid phase makes it possible to disperse the gases in the continuous liquid phase.

For the purpose of the present invention, the term "continuous gas phase" is intended to mean a gas phase having a physical continuity, as opposed to a discontinuous gas phase consisting of a collection of gaseous media with no contact between them, such as gas bubbles dispersed in a liquid medium.

According to one embodiment of the process according to the invention, the gas obtained in step a) is transferred from the first bioreactor to the second bioreactor through the creation of a pressure differential between the two bioreactors.

The gas obtained in step a) may thus be transferred into the second bioreactor in order to be enriched therein according to step b) of the process.

Any system known to those skilled in the art which allows the creation of a pressure differential between the first bioreactor and the second bioreactor may be used. Typically, a compressor may be used.

According to one embodiment of the process according to the invention, $H_2$ and $CO_2$ can also be injected into the second bioreactor.

The additional injection of $H_2$ and $CO_2$ into the second bioreactor makes it possible to modify the stoichiometry of the gases in order to work with different stoichiometric conditions in the two reactors. Advantageously, the gas mixture injected into the first reactor contains an excess of $H_2$, so as to promote the transfer thereof, and $CO_2$ is added in the second reactor in order to ensure a high methane content.

Those skilled in the art are able to adjust the temperature, pressure and flow rate parameters in order to make the process according to the invention work.

Purely by way of illustration, the temperature may be between 50 to 70° C., typically between at 60 to 70° C.

By way of illustration, the pressure will be between 1 and 20 bar, preferentially between 2 and 18 bar, preferentially between 3 and 16 bar, preferentially between 4 and 14 bar, preferentially between 5 and 12 bar.

The invention also relates to a device for producing methane, comprising:
- a first bioreactor comprising methanogenic microorganisms in a liquid medium; said liquid medium being a continuous liquid phase;

a second bioreactor comprising a continuous gas phase and a system which makes it possible to increase gas exchanges;

a device which makes it possible to inject the incoming gases into said continuous liquid phase contained in the first bioreactor;

at least one means for supplying with liquid medium contained in the first bioreactor cooperating with the second bioreactor, said means being capable of supplying the second bioreactor with liquid medium, said supply means comprising pumping means ensuring the circulation of the liquid medium contained in the first bioreactor to the second bioreactor, said liquid medium circulating by gravity on said system which makes it possible to increase gas exchanges, said liquid medium being recovered in said first bioreactor; and at least one means for transferring the gas mixture contained in the first bioreactor to the second bioreactor.

The term "device for producing methane" is intended to mean an ex situ methanation device.

Typically, the circulation of the liquid medium contained in the first bioreactor to the second bioreactor can be carried out via pumping means such as a peristaltic pump or any other means known to those skilled in the art for ensuring the circulation of the liquid from the first bioreactor to the second bioreactor.

Preferentially, the means for supplying with liquid medium is configured to supply the upper part of said second bioreactor with liquid. Even more preferably, the liquid is sprayed into the upper part of the second bioreactor. Typically, the spraying can be carried out by means of a spray.

According to one embodiment, the means for transferring the gas mixture contained in the first bioreactor to the second bioreactor is a device which makes it possible to create a pressure differential between the two bioreactors.

Typically, said means for transferring the gas mixture is a compressor.

By way of illustration, the compressor will be located upstream of the first bioreactor and will make it possible to create a pressure differential between the two bioreactors so as to allow the transfer of the gas mixture obtained in the first bioreactor to the second bioreactor. Thus, the gas is transferred either directly in the case where the two reactors are two stages within one and the same reactor, or by means of a pipeline if the two reactors are separate.

According to one embodiment, the device according to the invention also contains a means for supplying incoming gases, preferentially $H_2$ and $CO_2$, into the second bioreactor.

Advantageously, this additional injection makes it possible to modify the stoichiometry of the gases.

Typically, this supply means may be achieved with a compressor and a flow meter which makes it possible to adjust the flow rate of additional gas injected.

According to one embodiment, the first bioreactor is chosen from a bubble column, a mechanically stirred column, an infinitely mixed reactor or an airlift reactor.

According to one embodiment, the device which makes it possible to inject the incoming gases into the continuous liquid phase is chosen from fine bubble diffusers such as a porous column bottom diffuser, a pierced tube, a porous membrane made of polymers or of ceramic material, a valve bubbler, or from bubble-free membrane contactors such as hollow fiber membranes, or from hydroejectors or static mixers.

According to one embodiment, the device which makes it possible to inject the incoming gases into the continuous liquid phase is a fine bubble diffuser. According to this embodiment, the first bioreactor may also comprise a structured packing. The structured packing makes it possible to disperse the bubbles.

According to one embodiment, the second bioreactor is chosen from a percolation reactor, a random packed column, a structured packed column, a spray column, a falling film column or a tray column.

According to one embodiment, the system which makes it possible to increase the gas exchanges of the second bioreactor is a packing system. Typically, the packing system is understood to mean any system which makes it possible to increase the contact surface between the liquid phase and the gas phase in order to increase the exchanges in the second bioreactor.

By way of illustration, the packing system may be a random packing consisting of Pall® rings, preferably of ⅝-inch Pall® rings and having a diameter of 15 mm and a height of 15 mm.

Preferentially, the first bioreactor is a bubble column and the second bioreactor is a percolation reactor.

BRIEF DESCRIPTION OF THE DRAWINGS

Other characteristics, details and advantages of the invention will emerge on reading the detailed description below, and on analyzing the appended drawings, on which:

FIG. 1 shows a device for producing methane according to the prior art;

FIG. 2 shows a device for producing methane according to one embodiment of the invention, in which the two bioreactors are combined ("two-stage system");

FIG. 3 shows a device for producing methane according to another embodiment of the invention, in which the two bioreactors are connected by a means for transferring the gas mixture;

FIG. 4 shows a curve representing the productivity of NL $CH_4/L_{useful}/h$ as a function of the methane content (% $CH_4$) of a prior art process ("1 stage: bubble column") and of the process according to the present invention ("2 stages: bubble column+percolation") as represented in FIG. 2;

FIG. 5 shows a curve representing the $CH_4$, $CO_2$ and $H_2$ composition of the outgoing gas as a function of time of the process according to the present invention ("two-stage system"). The composition is expressed on a dry gas basis.

DESCRIPTION OF EMBODIMENTS

The drawings and the description below contain essentially elements of a certain nature. They may therefore not only serve to better understand the present invention, but also contribute to the definition thereof, where appropriate.

Reference is now made to FIG. 1. The device 10 as represented in FIG. 1 is a methanation reactor of the prior art allowing the production of methane and comprising a single reactor 11 comprising a 22-liter bubble column (with a useful volume of 18 liters), which is gas-tight and thermally insulated. The temperature within the bubble column reactor is maintained at approximately 55° C. by the presence of a water circulation jacket 12.

A mixture of incoming gases 13, $H_2$ and $CO_2$, is injected into the bubble column 11 by a sintered fine bubble diffuser 14 in the lower part of the bubble column 11.

The upper part of the reactor consists of a polyvinyl chloride (PVC) plate pierced with 7 orifices (not represented) allowing the passage of probes. The device 10 also comprises a gas outlet equipped with a condenser 15, a gas outlet 26 to a meter of, a gas loop 16 connected to analyzers 17 (analysis of the outgoing gases making it possible to quantify respectively the $CO_2$, $H_2$ and $CH_4$ contents), a loop for gas recirculation 24 from the upper part of the reactor to the lower part, an orifice 21 for mixing the recirculated gases with the incoming gases, an inlet 18 for the supply of nutrient solution, and a purge of the liquid medium 27. A three-way valve 22 allows sampling of the gas in order to verify the composition of the gas by gas chromatography or for regenerating the gas and the anoxic medium in the gas headspace.

The dissolved carbon dioxide concentration, the redox potential and also the pH are measured by probes 23 immersed in the liquid medium (directly in the reactor). The probe allowing measurement of the pH also makes it possible to measure the temperature.

The bubble column comprises a liquid medium consisting of hydrogenotrophic methanogenic, acetoclastic methanogenic and homoacetogenic microorganisms, of nutrients and of trace elements.

According to this embodiment of the prior art, the gas supply is carried out via two synthetic-gas cylinders each comprising $H_2$ and $CO_2$. Mass flowmeters make it possible to finely adjust the entering flow rates of the incoming gases. Recirculation 24 of the gases from the top to the bottom of the column is carried out at constant speed, by means of a valve pump 25. The objective of this recirculation 24 is to increase the gas retention rate and the retention time of the gas in order to increase the dissolution of the $H_2$ and the consumption by the microorganisms in order to reduce the residual $H_2$ concentration in the outgoing gas mixture.

The flow rate of the outgoing gas mixture is measured using a Ritter gas meter. The gases leaving the reactor pass through a condenser 15 maintained at 4° C. Part of the condensation water is reintroduced into the reactor in order to maintain the volume of the liquid medium.

The reactor is continually supplied with incoming gas ($H_2$ and $CO_2$). On the other hand, the supply of nutrients and the purging of the liquid medium are carried out batchwise. The quantitative determination of the sulfur is carried out using a piston syringe system. The taking of samples of liquid for analysis of the compounds is carried out in the lower part of the reactor. Typically, the nutrients are injected using a concentrated solution of nutrients, in particular $NH_4Cl$ at 20 g/l, $KH_2PO_4$ at 10 g/l, $MgCl_2$ at 2 g/l, $CaCl_2$ at 1 g/l, $Na_2S$ at 26.7 g/l and $NaHCO_3$ at 12.4 g/l.

The composition (proportion of $H_2$, $CO_2$, $CH_4$) of the outgoing gas mixture is measured continually by sampling in the upper part of the column.

Reference is now made to FIG. 2 reproducing a device 30 for producing methane according to one embodiment of the invention. This device makes it possible to carry out an ex situ methanation process. The components represented in FIG. 2 and bearing the same references as those of FIG. 1 represent the same objects, which are not described again below.

The methanation device or reactor 30 is composed of a bubble column 31 and a percolation reactor 32, which are gas-tight and thermally isolated.

The 22-liter bubble column 31 (with a useful volume of 18 liters) is connected to the percolation reactor 32 by a part 33 made of PVC. The bubble column and the reactor thus connected are clamped by a collar. The percolation reactor 32 is packed with ⅝-inch Pall® rings having a diameter of 15 mm and a height of 15 mm (Techim France).

The bubble column 31 comprises a liquid medium comprising hydrogenotrophic methanogenic, acetoclastic methanogenic and homoacetogenic microorganisms, nutrients and trace elements. The liquid medium of the bubble column 31 is pumped into the lower part of the bubble column 31 and is conveyed via a peristaltic pump 40 into the upper part of the percolation reactor 32. The liquid medium is injected by spraying using a spray 38 present in the upper part of the percolation reactor. The liquid medium circulating by gravity on Pall® rings will percolate through the rings in order to increase the contact surface between the liquid and the gas, and will then fall back into the bubble column 31. The gas mixture generated in the bubble column 31 diffuses in the percolation reactor, through a stainless steel grid 34 retaining the Pall® rings of the reactor 32.

The methane productivity is high, in particular by virtue of a relatively high hydrogen partial pressure, and a high flow rate, which thus allow high microbial growth. The gas mixture thus generated will diffuse, according to a pressure differential applied between the inlet of the bubble column 31 and the outlet of the percolation reactor 32, in the percolation reactor 32 in which the hydrogen and the carbon dioxide will be converted into methane so as to achieve a high methane content in the outgoing gas mixture. According to this embodiment, more than 80% of the hydrogen contained in the incoming gases is converted.

The part 33 allows connection between the bubble column 31 and the percolation reactor 32 and comprises tappings 331, 332, allowing gas chromatography analysis and/or liquid sampling. The part 33 in which the tappings 331 and 332 are shown diagrammatically is an enlargement, on FIG. 2, of this part in order to illustrate the tappings.

The concentration of dissolved carbon dioxide, the pH and the redox potential are measured using probes 36, 37 immersed in the liquid, either directly in the reactor (not represented), or in a cell 35 connected to the reactor as represented in FIG. 2. The pH probe also makes it possible to measure the temperature.

In the same way as above, the gas supply is carried out via two synthetic gas cylinders each comprising $H_2$ and $CO_2$. Mass flowmeters make it possible to finely adjust the inlet flow rates of the incoming gases. The flow rate of the mixture of outgoing gases is measured by a Ritter gas meter. The gases leaving the reactor pass through a condenser maintained at 4° C. Part of the condensation water is reintroduced into the reactor in order to maintain the volume of the liquid medium.

The reactor is continually supplied with incoming gases ($H_2$ and $CO_2$). On the other hand, the supply of nutrients and the purging of the liquid medium of the reactor are carried out batchwise. The quantitative determination of the sulfur is carried out using a piston syringe system. The taking of liquid samples for the analysis of the compounds is carried out in the lower part of the reactor.

The composition (proportion of $H_2$, $CO_2$, $CH_4$) of the outgoing gas mixture is measured continuously by sampling in the upper part of the column, by means of the same analyzers mounted in series as previously described.

Reference is now made to FIG. 3. The device represented also makes it possible to carry out an ex situ methanation process. The components represented in FIG. 3 and bearing the same references as those of FIG. 2 represent the same objects, which are not described again below.

In this embodiment, the bubble column 31 and the percolation reactor 32 are interconnected by pipelines and peristaltic pumps. This embodiment makes it possible in particular to use reactors of different diameters and to reduce the height of the reactor. The liquid medium contained in the bubble column 31 is pumped into the lower part of the bubble column 31 via a peristaltic pump 40 so as to be injected by spraying at the top of the percolation reactor 32 by means of a spray 38. The same liquid, in the same way as in the embodiment described in FIG. 2, will circulate by percolation on the Pall® rings and will be collected and reinjected via the tube 41 into the bubble column 31. The outgoing gas mixture generated in the bubble column 31 is transferred into the percolation reactor 32 by application of a pressure differential between the two bioreactors, if necessary by means of a compressor.

In the same way as previously, the gas supply is carried out via two synthetic gas cylinders each comprising $H_2$ and $CO_2$. Mass flowmeters make it possible to finely adjust the inlet flow rates of the incoming gases. The flow rate of the mixture of outgoing gases is measured by a Ritter gas meter. The gases leaving the reactor pass through a condenser maintained at 4° C. Part of the condensation water is reintroduced into the bubble column 31 in order to maintain the volume of the liquid medium.

The reactor is continually supplied with incoming gas ($H_2$ and $CO_2$). On the other hand, the supply of nutrients and the purging of the liquid medium of the reactor are carried out batchwise. The quantitative determination of the sulfur is carried out using a piston syringe system. The taking of liquid samples for analysis of the compounds is carried out in the lower part of the bubble column 31.

The composition (proportion of $H_2$, $CO_2$, $CH_4$) of the outgoing gas mixture is measured continually by sampling in the upper part of the column, by means of the same analyzers mounted in series as previously described.

EXAMPLES

Other advantages, aims and particular characteristics of the present invention will emerge from the examples that follow, given purely by way of explanation and which are in no way limiting.

In the examples that follow, the various parameters were measured using the techniques detailed below.

Measurement of the Productivity with Respect to the Methane Produced

The productivity with respect to the methane produced is calculated by means of the following measurement:

$$P_{CH_4} = \frac{\% \ CH_4 \ out \times Q_{g,out(dry)}}{V_{useful}} \quad [\text{Math. 3}]$$

With: $PCH_4 \times 10^3$=methane productivity in NL of $CH_4$/L of useful volume/h % $CH_4$out=percentage of methane in the outgoing gas expressed on a dry gas basis $Q_{g,out}$=flow rate of outgoing gas in NmL/h expressed on a dry gas basis $V_{useful}$=useful volume of the reactor in which the reaction takes place Measurement of the Microbial Biomass Concentration (VSS)

The measurement of the biomass concentration is estimated once a week by measuring the volatile suspended solids (VSS) according to the Afnor NF T90-105-2 standard.

The principle consists in taking a sample of known volume (75 ml in this case). After centrifugation for 15 minutes at 13 200 rpm and at 4° C., the pellet is introduced into a previously dried and weighed aluminum cup. The cup is then placed in an oven at 105° C. for 24 hours. The water having thus evaporated, there remains in the cup only the suspended solids (SS). The cup is then weighed after cooling in a desiccator. The difference in mass between the empty cup and the cup after it has gone through the oven thus corresponds to the SS contained in the sample. Taking into consideration the initial liquid volume, the measurement is expressed in $g \cdot L^{-1}$. The cup is then placed in a furnace at 550° C. for 2 hours. After cooling, the cup, which now contains only the mineral matter, is again weighed. The mass of VSS is obtained by the difference between the mass of VSS and the mass of the mineral matter.

Measurement of the Outgoing Gas Volume

The outgoing gas volume is measured by volumetry using a Ritter brand drum gas meter (TG 05 model 5). The volume is expressed on a dry gas basis.

Measurement of the $H_2$, $CO_2$ and $CH_4$ Contents

The $H_2$, $CO_2$ and $CH_4$ composition of the outgoing gas is measured using various analyzers mounted in series:

$H_2$ is measured by thermal conductivity by means of a Rosemount® Binos 100 2M analyzer.

$CO_2$ and $CH_4$ are measured with a non-dispersive infrared (NDIR) gas analyzer by using the Rosemount® X-stream analyzer.

Measurement of the pH and the Temperature

The pH and the temperature are measured using a probe and a transmitter from Mettler Toledo®.

Measurement of the Productivity/Methane Content Pairing

The productivity with respect to the methane produced is calculated by means of the formula detailed above and the $CH_4$ content is measured using the appropriate analyzer. Once this information had been obtained for various operating points, graphs representing the $CH_4$ content as a function of productivity were plotted and are as represented in FIGS. 4 and 5.

Operating Conditions

Temperature: 52 to 57° C.

Pressure: atmospheric pressure

The incoming gas flow rate varied from 6.3 to 43.6 NL/h.

Example 1: Evaluation of the Enrichment in Biogas and of the Productivity According to a Prior Art Process In the present example, the bioreactor used is the bioreactor as described in FIG. 1.

The bioreactor was inoculated using microorganisms (biomass) from organic waste methanizers. After biomass growth, the microorganism concentration was then adjusted around 3 g/l (VSS), by regular and appropriate purges of liquid and of biomass.

The pilot was continuously supplied with synthesis gases, $H_2$ and $CO_2$. The ratio between the flow rates of $H_2$ and of $CO_2$ was kept constant and the total flow rate gradually increased with the performance levels of the process.

The reactor operated for 300 days and the performance levels of the bioreactor were evaluated with regard to:

the methane content in the gas headspace;

the methane productivity in NL of $CH_4$ per L of reactor per hour ($PCH_4$ NL/Lreac/h).

The results are presented in the table below for various incoming gas flow rates:

TABLE 1

| $Q_{gin}$ (NL/h) | $Q_{gout}$ (dry) (NL/h) | % $CH_4$ | $PCH_4 \times 10^3$ (NL/$L_{useful}$/h) |
|---|---|---|---|
| 6.4 | 1.2 | 97.7 | 63.9 |
| 7.4 | 1.4 | 92.3 | 69.4 |

TABLE 1-continued

| $Q_{gin}$ (NL/h) | $Q_{gout}$ (dry) (NL/h) | % $CH_4$ | $PCH_4 \times 10^3$ (NL/$L_{useful}$/h) |
|---|---|---|---|
| 9.4 | 2.0 | 82.2 | 91.4 |
| 9.4 | 2.2 | 76.8 | 94.8 |

$Q_{gin}$ (NL/h) corresponding to the flow rate of incoming hydrogen and carbon dioxide in NL/h and $Q_{gout}$ (NL/h) corresponding to the flow rate of the outgoing gases in NL/h, expressed on a dry gas basis.

Example 2: Evaluation of the Enrichment in Biogas and of the Productivity According to the Process and Device of the Invention In the present example, the bioreactor used is the bioreactor as described in FIG. 2.

The bioreactor was inoculated using microorganisms (biomass) from organic waste methanizers. After biomass growth, the microorganism concentration was then adjusted around 3 g/l (VSS), by regular and appropriate purges of liquid and of biomass.

The pilot was continuously supplied with synthesis gases, $H_2$ and $CO_2$. The ratio between the flow rates of $H_2$ and of $CO_2$ was kept constant (and the total flow rate gradually increased with the performance levels of the process).

The reactor operated for 50 days and the performance levels of the bioreactor were evaluated with regard to:
the methane content in the gas headspace;
the methane productivity in mL of $CH_4$/L of reactor per hour ($PCH_4$ mL/Lreac/h).

The results are presented in the table below for various incoming gas flow rates:

TABLE 2

| $Q_{gin}$ (NL/h) | $Q_{gout}$ (dry) (NL/h) | % $CH_4$ | $PCH_4 \times 10^3$ (NL/$L_{useful}$/h) |
|---|---|---|---|
| 14.5 | 2.9 | 94.5 | 76.7 |
| 14.5 | 3.0 | 93.9 | 77.9 |
| 29.2 | 6.1 | 90.8 | 153.6 |
| 43.6 | 9.7 | 83.3 | 225.0 |

$Q_{gin}$ (NL/h) corresponding to the incoming hydrogen and carbon dioxide flow rate in NL/h and $Q_{gout}$ (NL/h) corresponding to the outgoing gas flow rate in NL/h, expressed on a dry gas basis.

The results obtained show that, with only one bubble column (1-stage reactor), a significant compromise must be made between the methane content of the exiting gas and the productivity. The addition of a second percolation stage makes it possible to simultaneously increase the productivity of the process and the methane content of the gas produced. By way of illustration, the bioreactor described in FIG. 1 makes it possible to obtain a productivity of $91.4 \times 10^{-4}$ $NL_{CH4}/L_{useful}$/h for a $CH_4$ content of 82.2% at the reactor outlet, whereas the bioreactor described in FIG. 2 makes it possible to obtain a productivity of $153.6 \times 10^{-4}$ $NL_{CH4}/L_{useful}$/h for a $CH_4$ content of 90.8% at the reactor outlet, that is to say a productivity and a $CH_4$ content of greater than 68.1% and 10.5% respectively.

Advantageously, the process and the devices according to the invention make it possible to simultaneously increase the productivity of the process and the methane content of the gas produced, with a simplified implementation, and in particular compared to the prior art process combining methanization and methanation steps.

The invention claimed is:

1. An ex-situ process for producing methane, comprising:
   a step (a), in a first bioreactor comprising methanogenic microorganisms in a liquid medium, of production of a gas mixture comprising methane, comprising bringing said microorganisms into contact with incoming gases;
   a step (b), in a second bioreactor, of methane enrichment of the gas mixture obtained in step (a), comprising transferring, from the first bioreactor to the second bioreactor, the gas mixture obtained in step (a) and at least a portion of the liquid medium contained in the first bioreactor, so as to increase the methane content in the gas mixture.

2. The process as claimed in claim 1, characterized in that the transfer of said liquid medium is carried out by sampling said liquid medium in the first bioreactor and then by injecting said liquid medium into the upper part of the second bioreactor so that said liquid medium circulates by gravity in the second bioreactor and is recovered in the first bioreactor.

3. The process as claimed in claim 1, characterized in that, in the first bioreactor, the liquid medium is a continuous liquid phase into which the incoming gases are injected, and in that the second bioreactor contains a continuous gas phase.

4. The process as claimed in claim 1, characterized in that the microorganisms are chosen from hydrogenotrophic methanogenic microorganisms, homoacetogenic microorganisms and acetoclastic methanogenic microorganisms or a mixture of these microorganisms.

5. The process as claimed claim 1, characterized in that the incoming gases are $CO_2$ and $H_2$.

6. The process as claimed in claim 1, characterized in that $H_2$ and $CO_2$ can also be injected into the second bioreactor.

* * * * *